July 12, 1955 E. H. LANHAM 2,713,090
TELEPHONE LINE CIRCUIT
Filed Sept. 15, 1952
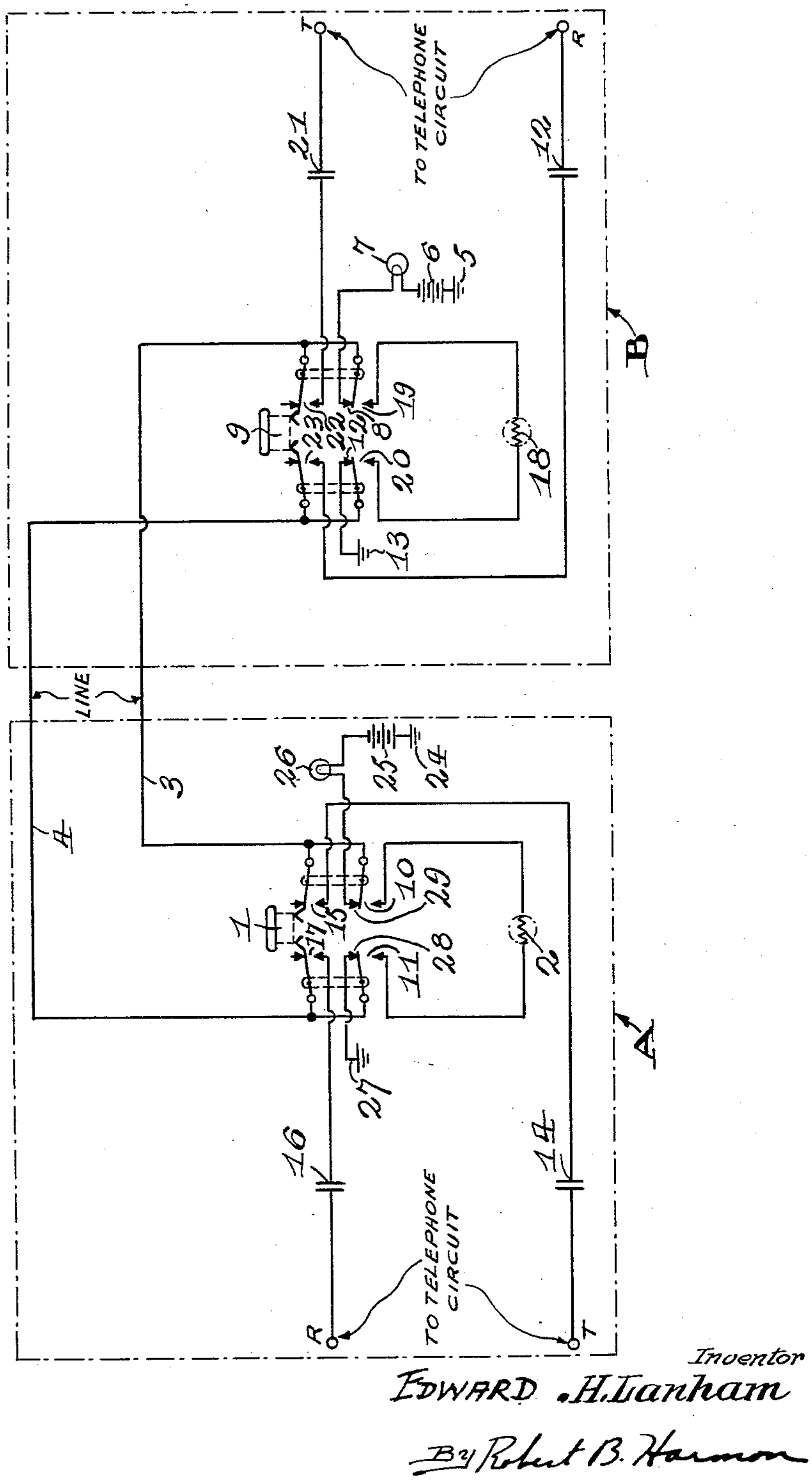
Inventor
EDWARD H. Lanham
By Robert B. Harmon
Attorney

United States Patent Office 2,713,090
Patented July 12, 1955

2,713,090

TELEPHONE LINE CIRCUIT

Edward H. Lanham, Montreal, Quebec, Canada, assignor to Northern Electric Company, Limited, Montreal, Quebec, Canada, a corporation of Canada Application September 15, 1952, Serial No. 309,657

4 Claims. (Cl. 179—84)

This invention relates to a telephone circuit particularly to signaling systems between subscriber's stations.

It has been the common practice in the past to signal over communication circuits, such as between subscribers, by sending a direct signaling current over the connecting line. This is accomplished by the operation of a circuit switching means, such as a key, which, by one method, permits a retardation coil to be bridged across the line at the calling station so as to allow D. C. signaling current at the called station to flow in sufficient volume to actuate the called station's signal device.

Upon the called station answering the call by the actuating of a current switching device, such as a key, the D. C. signaling current is disconnected from the signaling device and a retardation coil substituted therefor. In this way a retardation coil provides a low resistance path for the D. C. signaling current and a high impedance path to the alternating voice current when the circuit is in the talking condition. Since these retardation coils are retained in the telephone system at both the calling and called subscriber's stations during the talking period, only a single throw switch is necessary at these stations. Retardation coils are, however, expensive and bulky and when used in mounted equipment become a problem.

The object of this invention is to provide a D. C. signaling system for a telephone system which is simple, economical and reliable.

The applicant obtains these objects by substituting for the retardation coil in a system as described a resistor, which decreases its resistance with an increase in temperature, effective to permit the flow of D. C. signaling circuit therethrough to lower its resistance and allow the signaling circuit to flow in sufficient volume so as to actuate the signal device and to prevent the flow of talking voice current when the temperature of the resistance returns to normal upon the disconnection of the D. C. signaling current. Since the resistor can be mounted by means of its terminals, the necessity for providing a mounting means, as is necessary with respect to a retardation coil, is avoided. Due to the much smaller physical dimensions of this resistor with respect to a retardation coil of the necessary equivalent characteristics and the method of mounting the resistor, a device of much less weight and bulk with respect to a retardation coil is obtained.

These and other features of the invention will be more fully understood by referring to the single drawing and description and also from the appended claims, in which the drawing shows a telephone line or trunk circuit in which a resistance bridge is shown in accordance with the applicant's invention.

In the figures, A and B represented a calling and called subscriber station, provided with circuit switching keys 1 and 9 respectively shown in the normal position, each connected together by the line conductors 3 and 4 and associated therewith are energizing batteries 25 and 6; indicating devices 26 and 7 which may be a lamp; bridging thermistors 2 and 18; line condensers 14, 16 and 12, 21; respectively. The variable resistors 2 and 18 are made of a material such as silver sulphide or boron or uranium oxide having a high negative temperature coefficient of resistance.

In operation when a call is initiated, the key 1 is actuated at the calling station A the action of which closes contacts 11, 17, 10 and 15 and opens contacts 28, 29 of the switch and bridges the variable resistor 2 across the lines 3 and 4. The bridging of the resistor 2 across the lines 3 and 4 permits sufficient D. C. signaling current to flow at the called station B, which lowers the resistance of the resistor 2 and allows current to flow from ground 5, battery 6, signal lamp 7, contact 8 of switch 9 at station B, through line conductor 3, and at the calling station A through contact 10, variable resistor 2, contact 11, line conductor 4 and at the called station B, contact 12 to ground 13. The actuation of the key switch 1 at the calling station A also bridges the telephone talking circuit across the line conductors 3 and 4 the circuit being traced from the tip conductor T, condenser 14, contact 15 to line 3 and from the ring conductor R, condenser 16, contact 17 to line conductor 4.

The called party accepts the call by actuating his key switch 9 which breaks the contacts 8, 12 and makes contacts 19, 20, 22, 23, thus disconnecting the D. C. energizing circuit from the signal device 7. This action also bridges the resistor 18 and the telephone talking circuit across the line conductors 3 and 4, the circuit for the resistor being from the resistor 18, contact 19 to conductor 3 and from resistor 18, contact 20 to conductor 4 and for the telephone talking circuit from the tip conductor T, condenser 21, contact 22 to line conductor 3 and from the ring conductor R, condenser 12, contact 23 to line conductor 4.

The same action takes place when subscriber B is the calling party and subscriber A is the called party.

Since the resistance of the resistor 18 returns to the higher normal value when the D. C. signaling current is removed, very little or no telephone talking current flows through the resistors 2 and 18 when bridged across the line when the keys are in the talking position.

What is claimed is:

1. In a telephone station calling system including a subscriber's calling station and a remote subscriber's called station, a line interconnecting the stations, a signal device and a source of direct signaling current therefor at the remote station normally bridged across the line, a negative resistance element at the calling station, subscriber controlled switching means at the calling station associated with the resistance element constructed and arranged, when actuated, to bridge the said element across the line thereby completing the circuit therethrough said resistance element normally having a high resistance value and, when the current flow therethrough to decrease its resistance by a rise in its temperature, a resistance value low enough to allow sufficient current to flow in the line to actuate said device.

2. In a telephone station calling system in accordance with claim 1 having at the called station subscriber controlled switching means associated with said source of direct signaling current constructed and arranged when actuated to exclude said source from the line thus discontinuing the actuation of the signal device at the called station.

3. In a telephone station calling system including a subscriber's calling station and a remote subscriber's called station, a line interconnecting the stations, a signal device at each station and a source of direct signaling current for each device, a negative resistance element at each station, and subscriber controlled switching means at each station constructed and arranged, when said means at both stations are in the non-actuated position, to bridge said sources across the line so that the current from one source equally opposes that from the other source and, when said means at the calling station is in the actuated position, to exclude at the calling station said source from the line and to bridge said element at the calling station across the line thereby permitting current to flow through the line said elements normally having a high resistance and, when the current flows therethrough to decrease its resistance by a rise in its temperature, a resistance value low enough to allow sufficient current to flow in the line to actuate said device at the called station.

4. In a telephone system having in combination a subscriber's calling station and a remote subscriber's called station, a talking circuit at each station, a line interconnecting the stations, a signal device including an individual source of direct current at each station, a negative resistance element at each station, a plural position subscriber controlled switching means at each station so constructed and arranged when in the non-actuated position to bridge said sources across the line so that the current from the two sources are equally opposed and, when in the actuated position to exclude said source from the line and to bridge simultaneously said element and said talking circuit across the line at the respective station, said elements normally having a high resistance and, when the current flows therethrough to decrease their resistance by a rise in its temperature, a resistance value low enough to allow sufficient current to flow in the line to actuate said device at the called station.

References Cited in the file of this patent

UNITED STATES PATENTS

| | | |
|---|---|---|
| 2,139,249 | Welch | Dec. 6, 1938 |
| 2,332,872 | Shaun | Oct. 26, 1943 |
| 2,533,287 | Schmitt | Dec. 12, 1950 |